United States Patent [19]

Nomura

[11] 4,085,824
[45] Apr. 25, 1978

[54] WARNING DEVICE FOR FRICTION PAD IN DISK BRAKE

[75] Inventor: Yoshihisa Nomura, Toyota, Japan

[73] Assignee: Toyota Jidosha Kogyo Kabushiki Kaisha, Toyotashi, Japan

[21] Appl. No.: 752,863

[22] Filed: Dec. 21, 1976

[30] Foreign Application Priority Data

Dec. 29, 1975 Japan .......................... 50-176522[U]
Dec. 29, 1975 Japan .......................... 50-176523[U]

[51] Int. Cl.² ............................................. F16D 66/02
[52] U.S. Cl. ............................. 188/1 A; 116/114 Q; 188/218 A
[58] Field of Search .................... 188/1 A, 218 A; 116/114 Q

[56] References Cited

U.S. PATENT DOCUMENTS 3,354,992 11/1967 Cook et al. .................... 188/218 A
3,972,391 8/1976 Penn ............................. 188/1 A

FOREIGN PATENT DOCUMENTS 2,410,619 9/1975 Germany ....................... 188/1 A 1,942,167 2/1970 Germany ....................... 188/1 A

*Primary Examiner*—George E. A. Halvosa
*Attorney, Agent, or Firm*—Kane, Dalsimer, Kane, Sullivan and Kurucz

[57] ABSTRACT

A warning device for a friction pad in a disk brake of the type which includes a brake disk, and a pair of lined brake shoes which are disposed on the opposite sides of the brake disk and slidable towards the brake disk so as to hold the brake disk therebetween for frictional engagement. This warning device includes a contacting piece which is movable, together with at least one of the shoes, towards one of the side surfaces of the brake disk. A plurality of serrations or projecting portions are provided in part of the surface of the brake disk, which is adjacent to the frictional contacting surface of the brake disk. The projecting portions extend in the radial direction and are arranged in the circumferential direction of the disk. When the friction pads are worn down beyond a predetermined limit, the contacting piece contacts the projecting portions on the brake disk, thereby giving off a clattering noise for warning the driver to get brake service.

4 Claims, 8 Drawing Figures

WARNING DEVICE FOR FRICTION PAD IN DISK BRAKE

BACKGROUND OF THE INVENTION

1. Field of the Invention

This invention relates to a warning device for a friction pad or lining for use in a disk brake, and more particularly to a warning device which is best suited for use in a disk brake equipped with a ventilated disk.

2. Description of the Prior Art

Excessive wear of a friction pad or lining to be forced against a brake disk in an automotive disk brake leads to an accident and is a critical problem from viewpoint of safety of an automobile. For this reason, there have been proposed many attempts for warning the driver of wear of a friction pad or lining. However, prior art warning devices in general are resorted to an electric circuit to give a warning, resulting in a complicated construction and a tendency to cause various kinds of troubles.

SUMMARY OF THE INVENTION

It is accordingly an object of the present invention to provide a warning device for a friction pad in a brake disk, which device is relatively simple in construction and gives a warning positively and promptly wen the pad is worn down to a given degree and thus requires replacement.

It is another object of the present invention to provide a warning device for a friction pad in a disk brake which gives off an unusual loud noise when the friction pad is worn down, thereby warning the driver thereof.

According to the present invention, there is provided a warning device for a friction pad in a disk brake, which device includes a brake disk and a pair of friction means which are disposed on the opposite sides of the brake disk and slidable towards the brake disk, the device being characterised by a contacting piece which is movable towards one of the side surfaces of the brake disk, and a plurality of serrations or projecting portions provided in part of the surface of the brake disk which is adjacent to the frictional contacting surface of the disk, and the projecting portions extending in the radial direction but arranged in the circumferential direction of the disk.

According to the warning device, when a friction means is slidingly moved towards the brake disk for frictional engagement therewith, the friction means brings the contacting piece towards the projecting portions on the brake disk. In this respect, the contacting piece is so designed as not to contact the projecting portions until the friction pad is worn down to a given degree. When the friction pad is worn down to a given degree, and the friction means brings the contacting piece towards the projecting portions, then the contacting piece touches the projecting portions. This gives rise to vibration in the contacting piece, giving off a continuous clattering or striking noise, thereby warning the driver of a worn friction pad.

According to the present invention, a warning noise is given off due to the mechanical vibration of a contacting piece, so that there may be achieved a warning device which is simple in construction and may warn the driver of a worn friction pad, positively and promptly.

These and other objects and features of the present invention will be apparent from a reading of the ensuing part of the specification in conjunction with the accompanying drawings which indicate embodiments of the invention.

DESCRIPTION OF THE PREFERRED EMBODIMENTS

Figure 1:
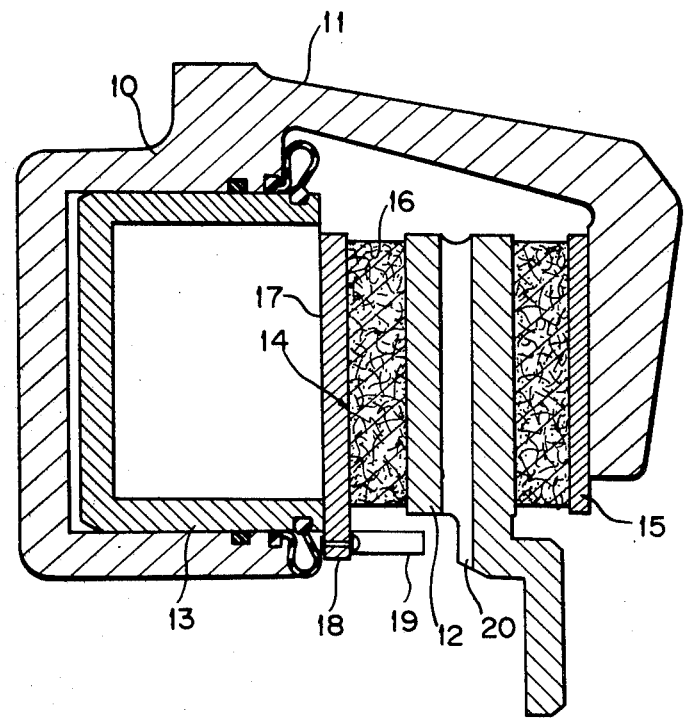
FIG. 1 is a cross-sectional view showing part of a disk brake including a warning device for a friction pad, according to the present invention.

Referring now to FIG. 1 there is shown part of a disk brake including a warning device according to the present invention. In general, disk brake inclues inner and outer friction means 14, 15 on the opposite sides of a brake disk 12, the means 14, 15 being slidable in the direction perpendicular to the surface of the brake disk 12. In addition, a caliper 11 includes a cylinder portion 10 on one side internally thereof and interposes a brake disk 12, and friction means 14, 15 between the cylinder portion 10 and a leg of the caliper 11. A piston 13 is fitted in the cylinder portion 10 in the caliper 11. The sliding movement or displacement of the piston 13 causes the inner friction means 14 to be forced against the brake disk 12, so that the caliper 10 in its entirety is moved by the reaction of the piston 13, with the result that the outer friction means 15 is brought into frictional contact with the brake disk 12 on the other side of the friction means 14.

The inner friction means 14 consists of a friction pad 16 and a shoe 17 supporting the friction pad 16 on the side opposite to the disk 12.

Figure 2:
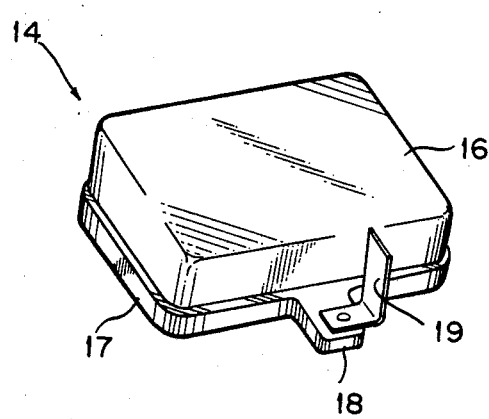
FIG. 2 is a perspective view of a friction means having a contacting piece.
Figure 3:
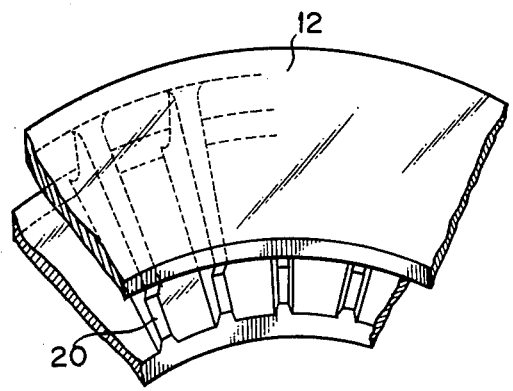
FIG. 3 is a perspective view, partly broken, of a brake disk having serrated or projecting portions, with which the contacting piece is to be brought into contact.

FIG. 2 is a perspective view of the inner friction means 14. The lower portion of the shoe 17 in the friction means 14 is integrally formed with an arm portion 18, to which in turn is attached a 'L' shaped contacting piece 19 by suitable fastening means such as rivets or bolts. The contacting piece 19 extends towards the brake disk 12. Provided in part of the surface of the brake disk 12, which is adjacent to the frictional contacting surface of the disk, are serrations or projecting portions 20 directed in radial direction but arranged in the circumferential direction, as shown in FIG. 3. The contacting piece 12 is directed towards the surface of the brake disk. In the example shown, the brake disk 12 is of a ventilated disk type and, faces the frictional surfaces of the friction pads. The brake disk 12 is provided with a plurality of fins or ribs thereon for a cooling purpose. Thus, the projecting portions 20 serve as cooling fins, part of which are exposed outside.

With the disk brake of the aforesaid arrangement, as the friction pad 16 in the inner friction means 14 is worn, the shoe 17 secured to the piston 13 and supporting the pad 16 makes closer approach to the disk 12. Thus, when the friction pad 16 is worn down to a given degree, then the shoe 17 makes further approach towards the disk 12, so that the tip of the contacting piece 19 secured to the shoe 17 is brought into contact with fins 20 on the brake disk 12.

As a result, the contacting piece 19 contacts the projecting portions or fins 20 on the disk 12 to cause vabrations, thus giving off a continuos unusual noise. In this respect, degree of wear of the friction pads in the both friction means 14, 15 are substantially equal. The aforesaid continuous unusual noise warns the driver that the friction pads in the friction means 14, 15 have reached their servicable limits and thus the driver has to get brake service, such as replacement for new friction pads.

Figure 4:
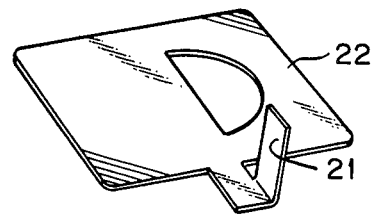
FIG. 4 is a perspective view of another embodiment of the contacting piece according to the present invention.
Figure 5:
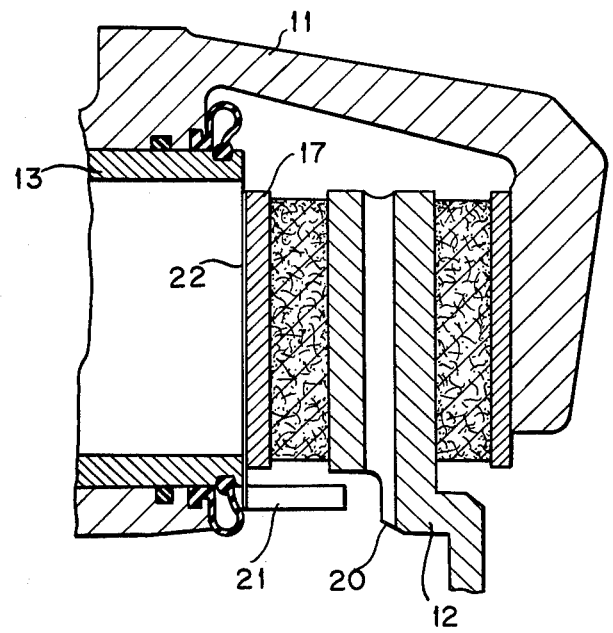
FIG. 5 is a cross-sectional view of part of a disk brake similar to that shown in FIG. 1, showing a condition of the contacting piece of FIG. 4, which is attached to a shoe for a pad.

FIG. 4 shows another embodiment of the contacting piece according to the present invention. A contacting piece 21 shown consists of a piece of plate member 22. The plate member 22 is formed with a flange portion protruding therefrom, while the flange portion is formed with an upright portion or contacting portion 21 which, as shown in FIG. 5, is positioned between the end of the piston 13 and the shoe 17 in the inner friction means 14. In this case, the contacting piece 21 faces the fins or projecting portions 20 on the brake disk 12.

As has been described earlier, according to the warning device for a friction pad in a disk brake of the invention, an initial spacing between the contacting piece 19 or 20 and the disk 12 is set equal to a wear limit of the friction pad 16, with the result that when the friction pad is worn to a given degree, then the contacting piece contacts the fins or projecting portions 20 on the disk, thereby giving off unusual noise for warning the driver.

In the foregoing embodiments, warning is given by noise produced due to vibrations of the contacting piece 19 or 21. However, it sometimes happens that such a noise is neutralized by noise from an engine or an environmental noise. To cope with such a case, there is provided a resonant member 23 as at 23 in FIG. 6 or 8, thereby making a warning noise louder.

Like parts are designated like reference numerals throughout FIGS. 1 to 3, and FIGS. 6 to 8.

Figure 7:
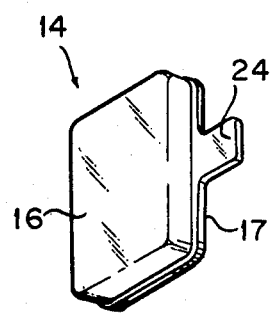
FIG. 7 is a perspective view showing a friction means of FIG. 6.

As shown in FIG. 7, the inner friction means 14 is formed with an arm portion 24 protruding from one side of the shoe 17.

Figure 6:
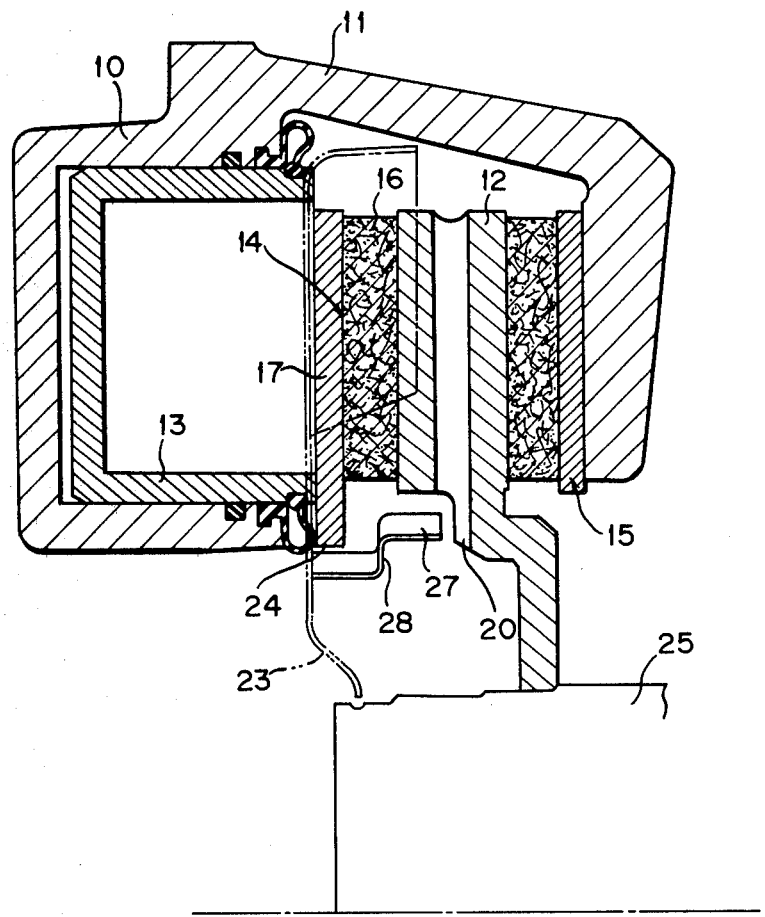
FIG. 6 is a cross-sectional view showing part of a disk brake equipped with a warning device for a friction pad, in a further embodiment of the present invention.
Figure 8:
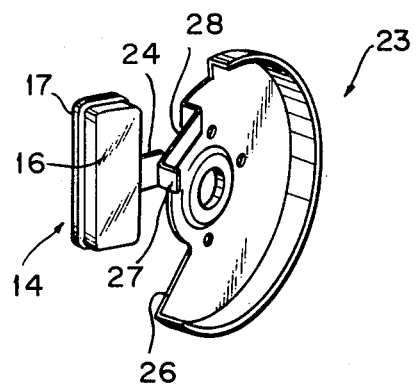
FIG. 8 is a perspective view of the friction means of FIG. 6, and a cover having a contacting piece.

The brake disk 12 in the disk brake is rigidly secured to an axle 25, while a splash shield or dust cover 23 of a flat pan shape is secured to a knuckle arm (not shown) positioned close to the disk 12 in surrounding manner to the disk 12. The splash shield 23 has a cut-away portion 26 as shown in FIG. 8 for admitting the caliper 11 shown in FIG. 6. The cut-away portion 26 is provided with a contacting piece 27 which is secured to the shield 23 integrally or coupled thereto by suitable fastening means such as rivets or by welding. The contacting piece 27, as shown in FIGS. 6 and 8, is of a 'Z' shaped cross section, with the end thereof extending towards the brake disk 12.

The splash shield 23 not only shields splash or dust for the brake disk 12 but also serves as a resonant member, when the contacting piece 27 causes vibrations. As an alternative, a separate resonant member may be attached thereto in a manner similar to that shown in the preceding embodiment.

Description will be turned to a positional arrangement of the contacting piece 27 and, caliper 11, i.e., the positional relationship of the contacting piece 27 to the inner friction means 14. The splash shield or resonant member 23 is secured to a body of a vehicle in the vicinity of the brake disk 12, while the caliper 11 is mounted on a supporting member (not shown) in a manner that the inner friction means 14 may be positioned in the cut-away portion 26 in the splash shield 23. The contacting piece 27 on the splash shield 23 is so positioned that an intermediate portion 28 of the contacting piece 27 may be in alignment with the arm portion 24 formed on the shoe 17 in the inner friction means 14 along the center axis of the disk 12.

Provided on the surface of the disk 12 in the direction facing the end of the contacting piece 27 are serrations or projecting portions 20 such as shown in FIGS. 1 and 3.

With the arrangement shown in FIGS. 6 to 8, when the friction pad 16 in the inner friction means 14 is worn down, then the shoe 17 having the arm portion 24 is moved, coupled with the piston 13, towards the brake disk 12 to make approach thereto, whereupon the arm portion 24 of the shoe 17 presses an intermediate portion 28 of the contacting piece 27, thereby subjecting the contacting piece 27 to an elastic deformation.

As a result, the end of the contacting piece 27 thus deformed is brought into contact with the exposed projecting portions or fins 20 on the brake disk 12, which is rotating, so that the contacting piece 27 causes vibrations and resultant intermittent impact noise. An impact noise or vibration noise given off from the contacting piece 27 is amplified by the splash shield 23 due to resonance, thereby positively warning the driver of worn friction pads.

As is apparent from the foregoing description of the warning device according to the present invention, a warning may be given due to mechanical vabrations without resorting to an electric circuit, thus allowing to warn the driver that the friction pads are worn down to their limits, in a simple but positive manner.

In addition, a vabration noise from the contacting piece, when the friction pads are worn down to a given degree, may be amplified due to the provision of the aforesaid resonant member, thereby making a warning noise loud enough. Thus, the driver may discriminate between the warning noise and the engine noise or environmental noise.

While the present invention has been described herein with reference to certain exemplary embodiments thereof, it should be understood that various changes, modifications and alternations may be effected by those skilled in the art without departing from the spirit and the scope of the present invention as defined in the appended claims.

I claim:

1. A warning device for a friction pad in a disk brake of a vehicle which includes a brake disk, and a pair of friction means which are disposed on the opposite sides of said brake disk and slidable towards said brake disk so as to hold said brake disk therebetween for frictional engagement, said friction means each consisting of a friction pad and a shoe holding said pad, said device comprising:

a resonant member comprising a flat shaped dust cover secured to a body of the vehicle in the vicinity of said brake disk in a manner that said dust cover surrounds said brake disk for protecting said brake disk from mud and dust;

a contacting piece being secured to said resonant member and extending towards one of the side surfaces of said brake disk;

an arm portion being formed on said shoe in one of said friction means and being capable of pressing and contacting piece towards one of the side surfaces of said brake disk when said friction means slides towards said brake disk; and a plurality of serrations or projecting portions being provided in part of the surface of said brake disk and extending in the radial direction and being arranged in the circumferential direction of said brake disk, said projecting portions being capable of contacting said contacting piece so as to vibrate said piece when said friction pad is worn down beyond a predetermined limit;

the vibration of said contacting piece being amplified by said resonant member due to resonance.

2. The warning device as set forth in claim 1, wherein said brake disk is of a ventilated disk type having ribs, part of which are used as projecting portions.

3. The warning device as set forth in claim 1, wherein said contacting piece is formed with said resonant member integrally.

4. The warning device as set forth in claim 1, wherein said brake disk is of a ventilated disk type which has fins, and part of said fins are used as projecting portions, and part of said resonant member serves as a contacting piece.

* * * * *

UNITED STATES PATENT OFFICE
CERTIFICATE OF CORRECTION

Patent No. 4,085,824                    Dated April 25, 1978

Inventor(s) Yoshihisa Nomura

It is certified that error appears in the above-identified patent and that said Letters Patent are hereby corrected as shown below:

At Column 1, line 27, - "wen" should read -- when --

At Column 2, line 33, - "inclues" should read -- includes --

At Column 3, line 13, - "vabra" should read -- vibra --

At Column 4, line 40, - "vabrations" should read -- vibrations --

At Column 4, line 44, - "vabration" should read -- vibrations --

At Column 5, Claim 1, line 9 "and" should read -- said --

Signed and Sealed this

*Twenty-fourth* Day of *October 1978*

[SEAL]

Attest:

RUTH C. MASON
*Attesting Officer*

DONALD W. BANNER
*Commissioner of Patents and Trademarks*